United States Patent
Hegde et al.

(10) Patent No.: US 11,645,524 B2
(45) Date of Patent: May 9, 2023

(54) SYSTEM AND METHOD FOR MACHINE LEARNING ARCHITECTURE WITH PRIVACY-PRESERVING NODE EMBEDDINGS

(71) Applicant: ROYAL BANK OF CANADA, Toronto (CA)

(72) Inventors: Nidhi Hegde, Edmonton (CA); Gaurav Sharma, Edmonton (CA); Facundo Sapienza, Edmonton (CA)

(73) Assignee: ROYAL BANK OF CANADA, Toronto (CA)

( * ) Notice: Subject to any disclaimer, the term of this patent is extended or adjusted under 35 U.S.C. 154(b) by 339 days.

(21) Appl. No.: 16/870,932

(22) Filed: May 9, 2020

(65) Prior Publication Data

US 2020/0356858 A1 Nov. 12, 2020

Related U.S. Application Data

(60) Provisional application No. 62/846,265, filed on May 10, 2019.

(51) Int. Cl.
| | |
|---|---|
| *G06N 3/08* | (2006.01) |
| *G06N 3/04* | (2023.01) |
| *G06F 16/901* | (2019.01) |
| *G06F 17/16* | (2006.01) |
| *G06F 17/18* | (2006.01) |
| *G06K 9/62* | (2022.01) |

(52) U.S. Cl.
CPC ........... *G06N 3/08* (2013.01); *G06F 16/9024* (2019.01); *G06F 17/16* (2013.01); *G06F 17/18* (2013.01); *G06K 9/6223* (2013.01); *G06N 3/0445* (2013.01); *G06N 3/0472* (2013.01)

(58) Field of Classification Search
CPC ...... G06N 3/08; G06N 3/0445; G06N 3/0472; G06N 3/0454; G06N 3/084; G06F 16/9024; G06F 17/16; G06F 17/18; G06K 9/6223
USPC .......................................................... 706/25
See application file for complete search history.

(56) References Cited

U.S. PATENT DOCUMENTS

2019/0340507 A1* 11/2019 Cervantes ................ G06N 3/08
2020/0225996 A1* 7/2020 Sharma .................. G06N 20/00

OTHER PUBLICATIONS

Martin Abadi et al., Deep Learning with Differential Privacy, arXiv:1607.00133v2 [stat.ML], Oct. 24, 2016.

(Continued)

*Primary Examiner* — Charlotte M Baker
(74) *Attorney, Agent, or Firm* — Norton Rose Fulbright Canada LLP

(57) ABSTRACT

A computer system and method for machine inductive learning on a graph is provided. In the inductive learning computational approach, an iterative approach is used for sampling a set of seed nodes and then considering their k-degree (hop) neighbors for aggregation and propagation. The approach is adapted to enhance privacy of edge weights by adding noise during a forward pass and a backward pass step of an inductive learning computational approach. Accordingly, it becomes more technically difficult for a malicious user to attempt to reverse engineer the edge weight information. Applicants were able to experimentally validate that acceptable privacy costs could be achieved in various embodiments described herein.

20 Claims, 10 Drawing Sheets

(56) References Cited

OTHER PUBLICATIONS

Amos Beimel et al., Bounds on the Sample Complexity for Private Learning and Private Data Release, https://www.cs.bgu.ac.il/-beimel/Papers/BKN.pdf, Sep. 18, 2013.

Jeremiah Blocki et al., The Johnson-Lindenstrauss Transform Itself Preserves Differential Privacy, arXiv:1204.2136v2 [cs.DS], Aug. 19, 2012.

Jie Chen et al., FASTGCN: Fast Learning With Graph Convolutional Networks Via Importance Sampling, arXiv:1801.10247v1 [cs.LG], Jan. 30, 2018.

Cynthia Dwork, Differential Privacy: A Survey of Results, Springer-Verlag Berlin Heidelberg, 2008.

William L. Hamilton et al., Inductive Representation Learning on Large Graphs, arXiv:1706.02216v4 [cs.SI], Sep. 10, 2018.

Peter Kairouz et al., The Composition Theorem for Differential Privacy, Proceedings of the 32 nd International Conference on Machine Learning, Lille, France, 2015. JMLR: W&CP vol. 37.

Diederik P. Kingma et al., ADAM: A Method for Stochastic Optimization, arXiv:1412.6980v9 [cs.LG], Jan. 30, 2017.

Thomas N. Kipf et al., Semi-Supervised Classification With Graph Convolutional Networks, arXiv:1609.02907v4 [cs.LG], Feb. 22, 2017.

Adam Paszke et al., Automatic differentiation in PyTorch, 31st Conference on Neural Information Processing Systems (NIPS 2017), Long Beach, CA, USA.

Michael Schlichtkrull et al., Modeling Relational Data with Graph Convolutional Networks, arXiv:1703.06103v4 [stat.ML], Oct. 26, 2017.

Prithviraj Sen et al., Collective Classification in Network Data, Association for the Advancement of Artificial Intelligence, AI Magazine, vol. 29 No 3, Fall 2008.

Aravind Subramanian et al., Gene set enrichment analysis: A knowledge-based approach for interpreting genome-wideexpression profiles, www.pnas.org/cgi/doi/10.1073/pnas.0506580102, Oct. 25, 2005.

Liang Yao et al., Graph Convolutional Networks for Text Classification, The Thirty-Third AAAI Conference on Artificial Intelligence, arXiv:1809.05679, Sep. 15, 2018.

* cited by examiner

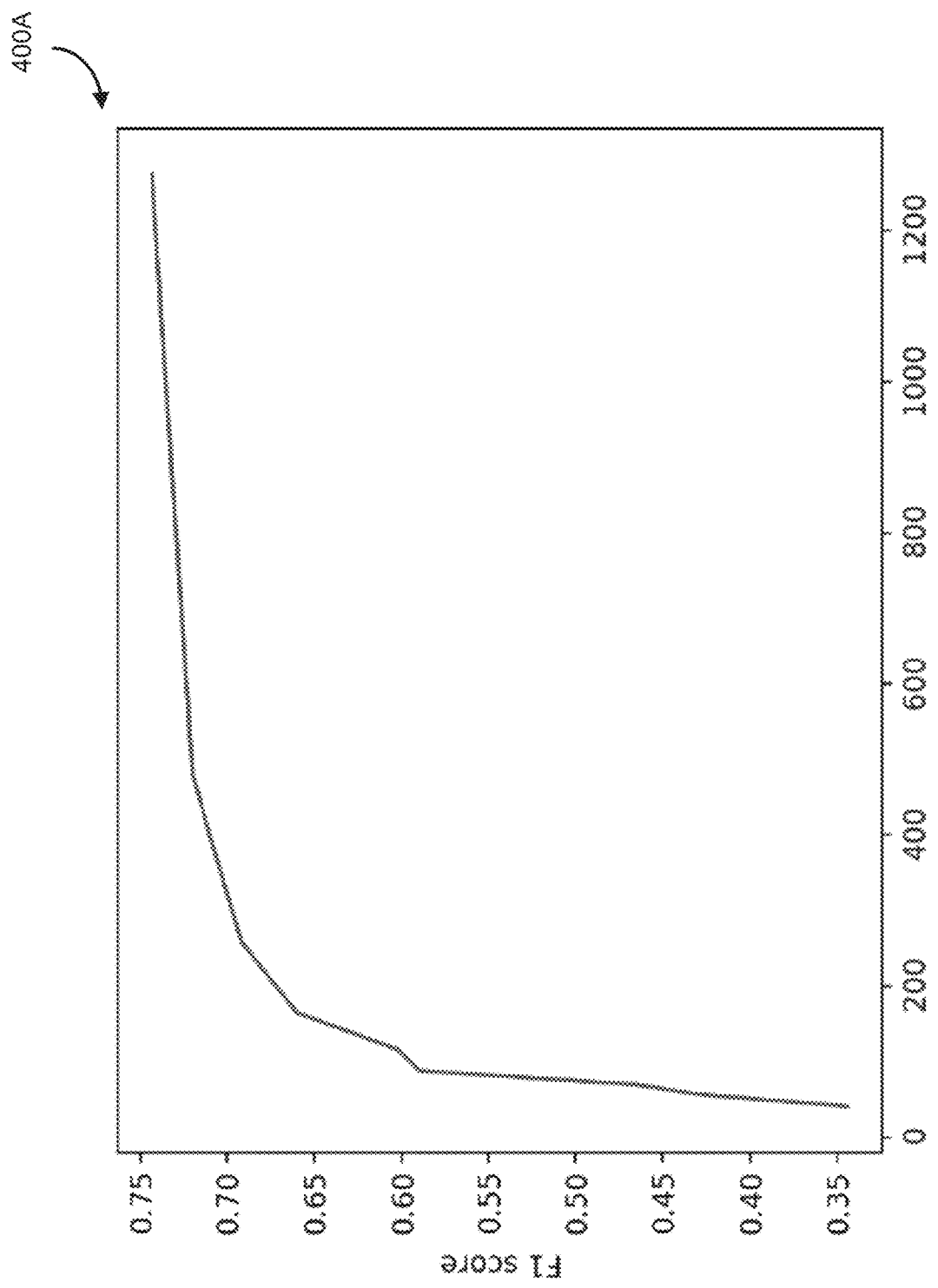

SYSTEM AND METHOD FOR MACHINE LEARNING ARCHITECTURE WITH PRIVACY-PRESERVING NODE EMBEDDINGS

CROSS-REFERENCE TO RELATED APPLICATIONS

This application is a non-provisional of, and claims all benefit, including priority to: U.S. Patent Application No. 62/846,265, filed May 10, 2019, entitled SYSTEM AND METHOD FOR MACHINE LEARNING ARCHITECTURE WITH PRIVACY-PRESERVING NODE EMBEDDINGS, incorporated herein by reference in its entirety.

FIELD

The present disclosure relates generally to machine learning, and in particular to specific approaches and architectures for computationally improving privacy when conducting training machine learning architectures on computational graphs.

INTRODUCTION

Recently, graph convolutional networks (GCNs) have become the state of the art for various machine learning problems on data represented as graphs. Graphs represent additional correlation structures that might not be extracted from feature vectors.

Many real-world datasets are and can be expressed on graphs, such as online social networks, molecular structure and interactions, collaboration and citation networks with text documents, etc. For instance, in the case of citation networks, nodes may represent authored manuscripts and edges represent citations between the documents.

A feature vector for a node may represent the text in the document. The documents can be classified only based on the feature vectors, but the graph structure may also impart more information on similarity that can enrich the text classification.

For online social networks with nodes representing individuals and edges representing contact structure, the feature vector for each node may be based on the individual's activities. The graph in this example may contain similarity and relationship structure that lead to embeddings with enriched community structure. GCNs can then be employed for learning low dimensional embeddings from the graph structure, which can in turn be used for node classification, clustering, link prediction, or text classification.

However, a technical problem with GCNs arises when there is sensitive information stored on the underlying graphs. It is desirable to be able to preserve privacy during inductive learning on graphs.

SUMMARY

As described in various embodiments, technical mechanisms that attempt to improve privacy when using graph networks as data structures for training graph convolutional networks is described.

A graph network is a data structure that has information that can be represented using proxy representations stored as data values. The graph data structure stores, in various types of data representations (e.g., linked list objects, arrays), a set of "node" objects that are interlinked by "edges". In other nomenclature, a node can be considered a "vertex" of the graph. From a computational perspective, each node can be represented as a separate data object and there can be stored a local or a global data array that represents the relationships thereof with other nodes (adjacency matrix). These relationships can be represented by way of data values indicative of "edge weights" relating to the strength of the relationships, and there can be different types of relationships represented in the edge weights.

A graph network data structure is an important mechanism for conveniently representing information where there are interrelationships between objects which themselves can have characteristics. Objects can be represented as logical nodes, and interrelationships can be represented as "edges". An example graph network is a social network where individuals are the logical nodes, having characteristics such as age, height, name, and edges can be interrelationships, such as "father", "son", "last messaged 5 weeks ago", "sent $20". There are various ways of representing graph network data structures, such as linked lists, arrays, etc. For example, interrelationships between individuals can be stored in the form of one or more adjacency matrices.

Graphs are useful for representing data having complex inter-relationships, and are an efficient mechanism for representing evolving networks where additional nodes, or information is added over a period of time. This is particularly useful where most of the information on the graph is relatively stable and new additions/updates take place on a subset of individual nodes during a particular duration of time. In the social network example, the graph is updated periodically when a new user joins, new connections are formed, or information is updated, but the general structure of the graph remains largely stable.

In this simplified example, a graph network can be used to represent a social network, and as new users create accounts, they can be tracked as new nodes. In this simplified example, some of the nodes are labelled. For example, the nodes can be labelled with various characteristics (e.g., a primary movie of interest) data value for each of the users. Not all of the users are have labels as this information may not have been captured. The nodes have edge weights, which in this case, can be based on whether the nodes are friends with one another, and having a value indicative of a strength of the friendship as tracked through interactions on the social network (e.g., increased value if the users attended the same institution or live in the same city).

In scenarios of interest in the present embodiments these edge weights may have sensitive information and thus require some level of privacy, meaning that the edge weights should not be readily ascertainable by other parties.

For example, it is desirable that a new user should not be able to accurately reverse engineer all of the friends and/or strengths of relationships thereof of another user. However, this is not true in the context of conventional graph convolutional network approaches. A technical vulnerability is present in non-private approaches when malicious users are able to effectively reverse engineer edge weights by taking a number of observations of outputs of the graph convolutional network. As the number of observations increases, it becomes possible to use "brute force" approaches to identify the edge weights.

In an example where the social network is processed to generate "friend recommendations", a technical vulnerability arises from generation of inductive learning based predictions for the friend recommendations where a malicious user can record thousands of friend recommendations and use this information to rebuild a part of or all of the social network graph because the observations are used to recreate the represent rich latent information about correlation or dependence between the nodes.

Accordingly, the lack of privacy in other approaches leads to lower adoption as the non-private machine learning approaches should not be used for sensitive information.

Privacy breaches are a risk and an important technical issue to be dealt with as the edge weight information could include highly sensitive information (e.g., voting patterns; financial information such as whether a loan exists, and how much; personal/professional relationships). An example extremely sensitive situation could be where the graph networks are utilized for pandemic contact tracing, and the individuals are providing information voluntarily but do not wish for the contact tracing information to be attributable. Accordingly, many real world graphs contain sensitive information. A practical situation where this can have grave consequences is the setting of online social networks. An adversary can create fake accounts in such social networks and based on the labels released by this framework can potentially infer edges between users which are generally sensitive. This limits the applicability of powerful GCN models with no privacy guarantees in these settings.

The techniques described herein are directed to enhance differential privacy of edges in graphs where graph convolutional networks are used to predict labels of previously unseen nodes. Scalable methods have been developed that ensure differential privacy for learning node embeddings and predicting labels in large graphs. If privacy is enhanced, the potential uses of sensitive information in graph networks can be expanded.

A technical challenge addressed by embodiments herein is whether machine learning approaches are able to incorporate the improved privacy while still maintaining some level of acceptable performance relative to non-private approaches. Experimental data indicates that while there is some level of lost technical performance, enhanced privacy is still practically feasible with some technical approaches for inductive learning described herein.

Inductive learning is adapted to the task for learning a node embedding function on graph data that can be used, for example, to classify previously unseen nodes using this framework. Differential privacy has become the de-facto standard for privacy-preserving techniques to provide strong mathematical privacy guarantees. In course of experimentation, it was found that applying standard techniques for ensuring differential privacy to the GCN setting is not scalable to large graphs.

In particular, techniques are now investigated and proposed herein to ensure differential privacy of edges in a graph where GCNs are used to predict labels for previously unseen nodes.

The contributions are directed to (1) a proposed sampling approach for GCNs that is scalable to large graphs and is amenable to privacy-preserving techniques; and (2) a proposed perturbation approach that ensures edge differential privacy for the GCN framework, according to some embodiments. These contributions can be considered separately, or in some embodiments, together. The approaches are implemented on computer hardware (electronic circuitry) and software, and are used for processing of graph data networks, and are implementations of scalable methods for promoting differential privacy for learning node embeddings and predicting labels in large graphs. Variants can be implemented in the form of computer systems, methods, and computer program products (e.g., non-transitory computer readable media storing machine-readable instructions).

A graph data structure is first received by the system for processing, representing a graph network.

The proposed sampling approach includes, for each epoch of a set of training epochs, first selecting a set of seed nodes that will be utilized to compute a set of embeddings. To determine the embeddings, the embeddings of neighboring nodes are aggregated (e.g., a sum of their embeddings) and then dimensionality reduction is applied (e.g., multiply by a weight matrix, effectively multiplying an adjacency matrix with the feature matrix. The number of neighboring nodes incorporated can include multiple levels ("hops").

The number of hops can be zero to a plurality, and in some embodiments, two hops are utilized as two hops experimentally yields good performance. For example, at two hops, a friend of a friend of a seed node would be utilized for the determination of the embedding for dimensionality reduction.

Accordingly, the sampling approach includes, for each epoch, a "forward pass" stage where node sets based on the first hop, second hop, and so on, can be established and utilized for obtaining embeddings for a prediction. Subsequently, a "backward pass" sage is then utilized to compute private gradients of the loss with respect to the embeddings and the weights.

The sampling approach iterates across T epochs such that each node of the selected seed nodes is used to update gradients of a loss function such that a weight matrix is iteratively updated. The loss function is tracked in the graph convolutional network such that weights in every epoch to optimize the loss in the loss function. The objective is to iteratively refine and learn the weight matrix, which can be initialized, for example, as a uniform value, random weights, among others. The weight matrix is used to conduct dimensionality reductions against embeddings at various steps such that a prediction can be generated relating to a particular desired output. The weight matrix, can also be denoted as a "feature matrix".

The weight matrix is learned, for example, from nodes where labels are already known used as a training set to optimize the loss function, and a reward is provided when the embedding of the weight matrix predicts a correct classification, or a penalty is applied when the embedding of the weight matrix predicts an incorrect classification. Different hyperparameters can be used for the training and different initializations of the weight matrix are possible, which may have effects on the training convergence rate required to obtain an acceptable level of accuracy in respect of the training or a test data set before deployment.

When the weight matrix is sufficiently well trained (e.g., achieves sufficient accuracy or a minimum number of training epochs have been applied), it can then be deployed as a "trained graph convolutional network". The trained graph convolutional network (or just a representation of the weight matrix) can then be applied to conduct or generate output data sets representative of predictions on existing/new nodes of the input graph network, or applied on different graph networks that share at least some domain similarity with the original input graph network it was trained on.

When new nodes are added to the network, for example, the learned loss function represented in the learned weight matrix can be applied to guess a label of the new node after being trained across nodes that already have known labels. Other types of computer-based guessing/predictions are possible, such as recommended edge relationships (e.g., friend suggestions), among others.

The proposed sampling approach is modified with noise injection at various stages of determinations to provide for the proposed perturbation approach. The approach includes the incorporation of a noise matrix whenever the adjacency matrix of a particular node is utilized. The noise, for example, can include Gaussian noise, or other types of noise. In some embodiments, a different noise matrix is sampled each time such that a new matrix is utilized every time edge weights are utilized. The noise matrices can be pre-generated to reduce computational costs. In other embodiments, the noise matrices are the same.

Accordingly, the forward pass is modified to include, when aggregating embeddings from direct neighbors of the seed nodes, an injected noise matrix. When aggregating embeddings from leaf nodes that are also n-hop neighbors of the seed nodes, a same or different injected noise matrix when the adjacency matrices are utilized.

Experiments were run on citation networks against two data sets and also on a protein-protein interaction network in relation to another data set. These experiments were run against conventional benchmark data sets which provide a baseline for performance relative to non-privacy enhancing approaches so that Applicants can determine whether the approaches are able to function with an acceptable cost associated with the enhanced privacy.

There will always be a cost for enhancing privacy, and an objective is to ensure that this cost remains manageable despite the use of the approaches with large networks. A number of different parameters and settings were computationally tested.

Applicant notes that while social networks are provided as an illustrative example, other types of graph networks where privacy can be an important objective in maintaining include graph data networks storing financial information (e.g., merchant/individual relationships, loan relationships, credit card information, transaction information), health information (e.g., genetics), computer network information (e.g., nodes are computing devices or IP addresses), or web data objects (e.g., consider a image sharing/social media service where individuals are able to save and pin various web data objects, and input interrelationships, or a graph of web history of a user).

The approaches described herein can be utilized in these contexts to improve security of the edge weights when generating predictions based on inductive machine learning approaches, and the amount of privacy can be "tuned" in accordance to variations described herein, as there is a technical tradeoff against machine learning performance.

In another aspect, the input graph data structure is evolving with new or updated nodes.

In another aspect, the processor is configured, for at least one new or updated node, utilize the trained graph convolutional network to generate a prediction data object relating to the at least one new or updated node.

In another aspect, the prediction data object is adapted to generate one or more connection recommendations identifying a target node that the at least one new or updated node is computationally estimated to be related with.

In another aspect, the input graph data structure is a social networking graph, and wherein the one or more connection recommendations include at least one of friend, business contact, and colleague recommendations.

In another aspect, the prediction data object is adapted to generate a predicted classification label associated with the at least one new or updated node.

In another aspect, the input graph data structure is a social networking graph where each node represents an individual, and the predicted classification label is at least one of a personal characteristic of the individual.

In another aspect, the sampling follows a probability distribution of:

$$q(u) = \frac{d_u^p}{\sum_{v \in V} d_v^p}, u \in V;$$

where $d_u^p$ refers to the number of edges of node 'u' in the graph raised to a power p.

In another aspect, p is a modifiable parameter that varies an intensity to which high degree nodes are sampled for the subset of nodes.

In another aspect, the one or more degrees of neighbor hop degrees includes two degrees of neighbor hop degrees.

In another aspect, a trained model architecture representing a trained feature matrix is trained on a first input graph, and then deployed for use in generating predictions against a second graph.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIG. 4A is a plot showing F1 score vs epsilon for the Cora dataset with σ varied from 0.1 to 1, according to some embodiments.

It is understood that throughout the description and figures, like features are identified by like reference numerals.

DETAILED DESCRIPTION

Figure 1:
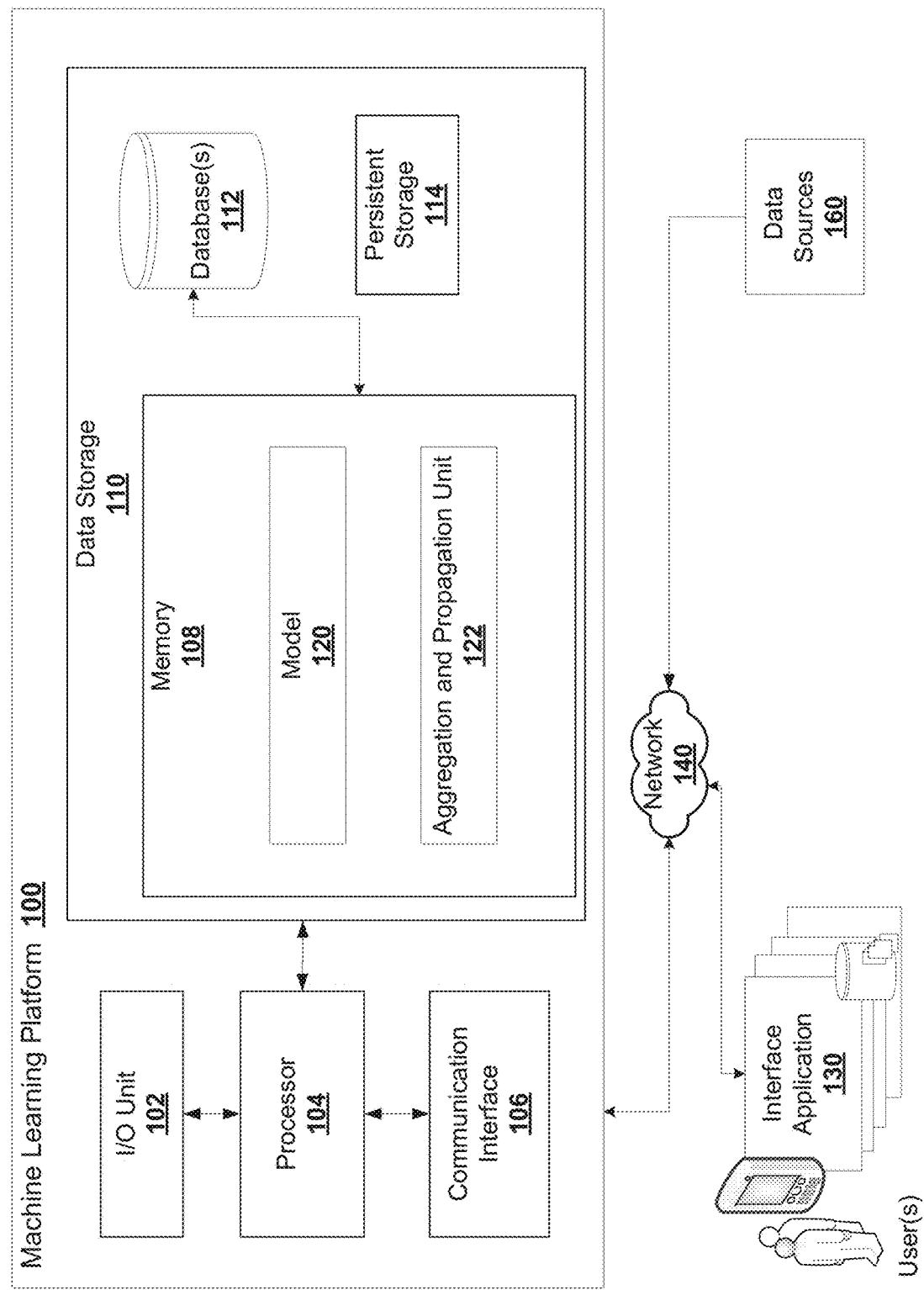
FIG. 1 illustrates, in a schematic diagram, an example of a physical environment for a machine learning platform, in accordance with some embodiments.

Embodiments of methods, systems, and apparatus are described through reference to the drawings.

A technical challenge with the practical implementation of the GCNs is that they have a technical vulnerability in relation to inductive learning, where a malicious user is able to establish elements in the GCN that deliberately cause an inference between edges of logical objects that should not have connections with one another.

As far as Applicants are aware, there is no current research literature on privacy-preserving mechanisms for GCNs that are practically useful in view of privacy costs and scalability. Prior approaches to privacy have been proposed but are deficient in that they do not scale well to large graphs. The cost of implementing privacy becomes infeasible and performance is impacted to such an extent that it is not commercially practical. For example, a deficiency in applying the Johnson-Lindenstrauss (JL) transform that allows the publishing of a sanitized graph that preserves edge differential privacy is limited in that it applies to direct queries on the graph, such as cut queries and variance estimation, and is not extended to problems such as learning node embeddings in the inductive framework.

The approach described herein includes two components, which may be independent with one another in some embodiments, sequential, in various orders, or conducted in parallel in other embodiments.

The first component to the approach is a sampling method, and the second component is a perturbation method where noise is injected whenever edge information is utilized (for example, in an adjacency matrix).

Experiments were run on citation networks against two data sets and also on a protein-protein interaction network in relation to another data set to show that the privacy costs of performance were acceptable. The citation networks and the protein interaction network provide baselines for performance where no privacy is utilized, and for this approach to be practically useful, a technical solution needs to have a sufficiently acceptable privacy cost. Parameters are modified to test variations of parameters to identify how sensitive the performance costs of privacy are to parametric shifts.

Recently, graph convolutional networks (GCNs) have become the state of the art for various machine learning problems on graphs, for example, learning low dimensional embeddings for node classification and link prediction. Many real world graphs (where they can be successfully employed) include sensitive information in the form of node features and edges. For example, in online social networks, users may want to keep their contact list hidden from other users; in e-commerce networks, they may want to hide the particular products they purchased; and so on and so forth.

Therefore, Applicants note that there is a desire that predictions in the form of node labels or link recommendations do not reveal this sensitive information.

The sensitivity of information limits the applicability of such powerful models with no privacy guarantees.

In some embodiments, there is provided new techniques to ensure differential privacy of edges in a graph where GCNs are used to predict labels for previously unseen nodes, which is referred to as the inductive setting. These new techniques overcome the inadequacies in present techniques to ensure edge privacy in graphs for this setting. In some embodiments, a method is provided for a better utility-privacy trade-off.

In some embodiments, in a framework of label prediction, data is represented as a graph, $G=(V, \varepsilon)$. Each node i has an associated feature vector, $X_i \in R^d$. In some embodiments, node embeddings represent both the nodes feature vector and the graph structure which determines the dependency between nodes.

In some embodiments, inductive learning on graphs comprises a task is to learn a node embedding function on graph data and classify previously unseen nodes using this framework.

Non-private approaches can reveal sensitive edge information between nodes in the underlying graph through the release of predicted labels for the unseen nodes. A practical situation where this can have grave consequences is the setting of online social networks. An adversary can create fake accounts in such social networks.

Based on the labels released by this framework, the adversary can potentially infer edges between users which are generally sensitive. In some embodiments, differential privacy may be used for privacy preserving techniques to provide strong mathematical privacy guarantees for this framework.

FIG. 1 illustrates, in a schematic diagram, an example of a physical environment for a machine learning platform 100, in accordance with some embodiments. The platform 100 may be an electronic device connected to interface application 130 and data sources 160 via network 140. The platform 100 can implement aspects of the processes described herein for machine learning on a graph.

The machine learning platform 100 can be implemented, for example, as a server device residing in a data center of a technology company, adapted for conducting inductive learning in respect of graphs that may be complete or incomplete. The graphs may be fairly large (e.g., thousands of nodes and tens of thousands of edges). The graphs may be directed or undirected. The graphs may have multiple edges representing different types of interrelationships. As described above, the graphs themselves may still be evolving and growing (e.g., a social network graph).

The platform 100 may include a processor 104 and a memory 108 storing machine executable instructions to configure the processor 104 to maintain a neural network representing model 120 (from e.g., data sources 160).

The model 120 can be a neural network having one or more machine learning layers that in concert provide a transfer function for establishing a transformation from an input into a classification. In some embodiments, this transfer function is represented in the form of a weight matrix/feature matrix whose weightings are updated and continually refined during the inductive learning process, through, for example, optimizing based on a loss function (e.g., trying to reduce the loss as much as possible).

The processor 104 is adapted to conduct inductive learning through the model 120 to iteratively analyze the graphs by sampling a subset of nodes, and then conducting analysis of neighboring nodes (up to a number of "degrees" or "hops", such as 2 degrees of hops"). As the graph can be very large, sampling approaches are important to be able to constrain the amount of computational steps that are needed during the training process to a practical amount of steps.

A supervised learning approach can be used in some embodiments wherein the information obtained from each of the nodes/node neighbors/node neighbor neighbors (up to whatever degree is being used), etc. is aggregated to generate classification predictions, which are then compared against known values. The identification of neighbors/neighbor neighbors, etc. can be conducted based on edge weights between nodes.

Model 120 maintains a set of hidden representations stored therein which are used to optimize a loss function that is utilized to conduct dimensionality reductions when tracking embeddings stored thereon various nodes. The hidden representations are optimized to reduce the loss such that classifications are generated through processing information through the model 120 based on information stored thereon the nodes or their neighbors or in edge relationships thereof ("embeddings") and generating predicted outputs. The loss function can provide a reward or a penalty for correct or incorrect classifications during training, respectively.

The model 120 can be initialized in various ways, such as having all weights set at some predefined value such as 0 or 1, or being randomized, or being transferred off of a base set of weights that were found to be generally useful for this type of graph (this type of "warm" starting could lead to reduced time requirements to achieve satisfactory accuracy). During each step of inductive training, the weights are then refined. As the loss function begins to track a smaller and smaller loss at each step of training, accuracy increases (assuming there is some underlying hidden relationship that can be tracked by model 120.

Various triggers can then be used to determine when model 120 is in a deployable state. For example, model 120 can be considered trained when it is able to obtain a sufficient level of accuracy in respect of a test data set (which, in a simple embodiment, can be a portion of the input graph that has been segregated away from a training data set). For example, model 120 could require 95% accuracy before deployment. In another embodiment, model 120 is considered to be deployable when a set amount of computing cycles have been expended or a finite amount of processing time has been incurred. For example, model 120 could be trained across one million training cycles or a maximum of eight hours, in which case it must then be deployed. This could occur where the model 120 is required to run on a daily basis and there is only so much time to conduct training. The model 120 can be stored on database 112 and when it is deployable, it can be stored on persistent storage 114.

The platform 100 can include an I/O unit 102, communication interface 106, and data storage 110. The processor 104 can execute instructions in memory 108 to implement aspects of processes described herein. The platform 100 may receive and transmit data from one or more of these via I/O unit 102. When data is received, I/O unit 102 transmits the data to processor 104.

Sources of data can include upstream data storage devices which track, for example, an input graph data structure as interactions with users are recorded and input, in the scenario of a social network. Other sources of data can include laboratory information data sets (e.g., for genetics), transaction storing data storage elements for a financial institution, among others.

The I/O unit 102 can enable the platform 100 to interconnect with one or more input devices, such as a keyboard, mouse, camera, touch screen and a microphone, and/or with one or more output devices such as a display screen and a speaker. The I/O unit 102, for example, can be used to receive new information about nodes, etc. For example, a person may input his/her job title as a string that is then received and processed to be added to a data structure or relational database. Other types of input can include security interest registrations, bank transaction details, genetic information, among others. As described herein, it is very important to protect the privacy of the information stored thereon from malicious users.

The platform 100 can also receive the graph information by way of a communication interface 106, for example, through a message bus. In this example, the platform 100 can receive, from time to time, data from upstream systems that track the graph in the form of various data objects.

The processor 104 maintains a trained neural network and/or can train a neural network in model 120 using training engine 124.

The model 120 is trained over a period of time by, for example, conducting supervised training where nodes of the graph having known correct classifications (e.g., nodes representing individuals having their self-provided job titles) are known, and other information stored in the embeddings, such as company name, income, educational background are used as proxies for generating classifications (e.g., predicted job title).

Graph convolutional networks are particularly useful where the inputs are graph data, such as interrelationships between individuals (e.g., this person reports to that person, this person wrote a compliment about this person, this person attended X conference with that person). However, these interrelationships may be private and individual nodes may not wish to make such information public.

When the model 120 is sufficiently trained, it can then be used to either generate output data structures representing predictions for nodes where information is missing (e.g., this individual didn't input a job title), for new nodes (e.g., this new user might have some friends), etc.

In a variant embodiment, instead of being used for an evolved version of the input graph or the original input graph, the model 120 is instead used on a second, different input graph that has similar characteristics as the graph it was originally trained on, and used to generate classifications or prediction outputs in relation to nodes of this second, different input graph.

In this variation, for example, a model 120 can be trained on a fully described social network, and then applied to a different social network where certain classification information is missing. For example, an organizational chart is known for company A. Company B operates in the same space. Trained model 120, trained on company A's graph is then ported over and used on company B's graph to generate estimated job titles. However, in this case, as described herein, it is important to be able to protect the edge weights of company A's graph as it is not desirable that someone is able to investigate the generated job titles to effectively build an accurate representation of all or part of company A's graph.

The processor 104 can be, for example, various types of microprocessor or microcontroller, a digital signal processing (DSP) processor, an integrated circuit, a field programmable gate array (FPGA), a reconfigurable processor, or combinations thereof.

The data storage 110 can include memory 108, database(s) 112 and persistent storage 114. Memory 108 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g., graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For example, communication interface 106 can be used to provide classifications or prediction outputs in the form of data structures, such as vectors or arrays storing logits (e.g., studentLogit=0.56, childLogit=0.25, graduatedLogit=0.85), or Booleans holding values (e.g., isStudent="TRUE"), strings representing classifications (e.g., Adam is a "student"), or values representing predicted numerical values (e.g., predicted amount of credit card debt).

The platform 100 can be operable to register and authenticate users (using a login, unique identifier, and password for example) prior to providing access to applications, a local network, network resources, other networks and network security devices. The platform 100 can connect to different machines or entities.

In some embodiments, platform 100 can receive tuning inputs from communication interface 106 (e.g., from a graphical user interface) indicating tuning parameters for modifying certain parameters of the model 120 and/or training thereof such that the desired privacy/utility trade-off can be modified. These parameters can include an amount of noise introduced, a number of epochs, a number of hops, a clipping threshold, among others.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, etc.

The memory 108 may include a model 120, and an aggregation and propagation unit 122. In some embodiments, the model 120 may include, or be represented by, a graph convolutional network. The graph and the unit 122 will be described in more detail below.

The model 120 is directed to an inductive framework of a GCN, where the system learn partial node embeddings in a graph and predict labels on unseen nodes.

Consider an undirected graph, $\mathcal{G} = (V, \varepsilon)$ with nodes $v_i \in V$ and edges $(v_i, v_j) \in \varepsilon$, with adjacency matrix $A \in \mathbb{R}^{n \times n}$, $n=|V|$, where $a_{ij}=1$ denotes the presence of edge $(v_i, v_j)$ (0 indicating absence).

Define the degree matrix $D=(d_1, \ldots, d_n)$ as a diagonal matrix with $d_i=1+\Sigma_{j \neq i} a_{ij}$. Let $\hat{A}=D^{-1/2}(A+I_n)D^{-1/2}$ be the normalized adjacency matrix with self connections. Each node $v_i \in V$ has an associated feature vector, $X_i \in \mathbb{R}^d$. In a variation, the approach can utilize instead the sampled unnormalized adjacency matrix A for forward and backward passes.

The objective is to learn low-dimensional node embeddings that represent both the node's dimension reduction of the feature vector and information contained in the graph structure that neighbors the node.

GCN in model 120 uses the connectivity structure of the graph and the input node features to compute low dimensional embeddings for every node. This allows mixing of neighbourhood information and node-level information, which has been shown to provide high-utility embeddings for a wide variety of tasks.

The architecture can be described by the following forward propagation rule:

$$H^{(l+1)} = \sigma(\hat{A} H^{(l)} W^{(l)}), \quad (1)$$

where $\sigma(\bullet)$ is a non-linear activation function, $H^{(l)}$ is the row-wise embedding matrix of the graph vertices for $l^{th}$ layer and $W^{(l)}$ is the weight matrix. The weights $W^{(l)}$ are trained using gradient descent. Batch gradient descent can be performed using the full graph in each iteration.

As described herein, Applicants are interested in scalable methods for large graphs, and Applicants therefore considering scalable sampling methods.

As the input graph structure may contain sensitive information about interactions between nodes, the machine learning platform 100 is adapted to incorporate edge-privacy, that is, privacy-preserving methods that protect edge information.

In particular, the machine learning platform 100 incorporates specific approaches to incorporate differential privacy using a modified inductive learning approach that can be provided using practical implementations of hardware and software (e.g., stored thereon machine interpretable instructions on a non-transitory data storage medium).

Trivial ways to ensure differential privacy like randomized response or using the JL transform on the adjacency matrix do not take the final objective into account while adding noise and as such they fail to provide a meaningful utility-privacy trade-off. Ensuring differential privacy in the GCN framework of model 120 is not straightforward.

An initial attempt would be to use the carefully calibrated method of adding noise to the gradient updates in the back propagation of neural network training. In GCNs however, there is a dependency in the layers through the graph adjacency matrix which means noise must be added at each layer where the adjacency matrix is used, leading to the addition of a large amount of noise for practical levels of privacy cost.

In the following embodiments, Applicants propose a different computational method for differential privacy.

Figure 2:
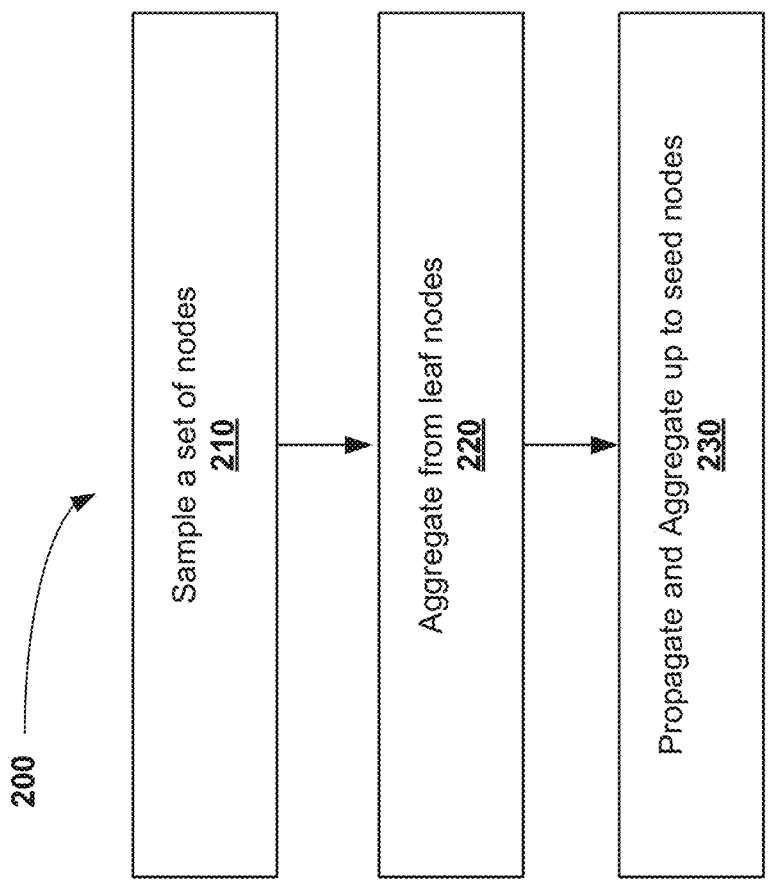
FIG. 2 illustrates, in a flowchart, an example of a method of machine learning on a graph, in accordance with some embodiments.

FIG. 2 illustrates, in a flowchart, an example of a method of machine learning on a graph 200, in accordance with some embodiments. Let $V_k$ be the set of K seed nodes selected in batch k. This set of nodes is sampled 210 according to their degree, following the probability distribution:

$$q(u) = \frac{d_u^p}{\Sigma_{v \in V} d_v^p}, u \in V$$

where p>0 allows for the varying of the intensity with which high degree nodes are selected.

Here $d_u^p$ refers to the number of edges of node 'u' in the graph (commonly referred as the degree of node 'u' in graph notation) raised to the power p. Uniform sampling is provided when p=0.

To ensure connectivity in the batch, all 2-hop neighbours (or other n-hops, 2 is used as an example) of the seed nodes may be selected. This results in the node sets:

$$\tilde{V}_{k,1} = \left\{v : v \in \bigcup_{u \in V_k} N_u\right\} \text{ and } \tilde{V}_{k,2} = \left\{v : v \in \bigcup_{u \in \tilde{V}_{k,1}} N_u\right\}$$

where $N_u$ is the set of neighbors of node u.

Since the objective is to learn private embeddings for inference tasks on large graphs, a scalable mechanism is described that is differentially private, based on sampling subgraphs. Applicants consider sampling methods for two reasons: they can be used to scale the model to large graphs, and they allow one to get good estimates of the parameters of the embedding function without computing embeddings for every node in the graph.

For large $\hat{A}$, computing embeddings and ensuring privacy in each step of the forward and backward propagation is difficult scalable.

Alternate approaches have proposed a framework to allow batched training of GCNs. These approaches use independent importance sampling of nodes at each iteration and each layer of the graph convolutional network to reduce variance in the estimation of learned parameters. This, however, can lead to aggregating over sparse neighborhoods.

Let $V_{t,s}$ be the set of M seed nodes selected in epoch t. This set of nodes is sampled at 210 according to following the probability distribution:

$$q(u) = \frac{d_u^p}{\sum_{v \in V} d_v^p}, u \in V,$$

where p≥0 allows one to vary the intensity with which high degree nodes are selected, and p=0 corresponds to uniform sampling.

To ensure connectivity in the batch, the approach includes selecting all n-degree (in an example 2-hop neighbours) of the seed nodes. For the purposes of this example, 2-hops are used but other numbers of hop corresponding to degrees of relationships can be used as well.

The platform 100 then has the node sets $$V_{t,S'} = \left\{v : v \in \bigcup_{u \in V_{t,S}} N_u\right\} \text{ and } V_{t,S''} = \left\{v : v \in \bigcup_{u \in V_{t,S'}} N_u\right\},$$

where $\mathcal{N}_u$ is the set of neighbors of node u.

Let $V_t = \{V_{t,s}, V_{t,s'}, V_{t,s''}\}$, denote the node set used in batch k, and $\varepsilon_k$ represents the edges $\{(v_i, v_j): v_i, v_j \in V_t\}$.

At 220, the aggregation and propagation unit 112 then aggregates and propagates starting at the leaf nodes (that are also 2-hop neighbours of the seed nodes) of the resulting sampled graph $\mathcal{G}_t = (V_t, \varepsilon_t)$.

In the case without privacy, Applicant proceed as follows for each batch.

(1) Aggregate from leaf nodes:

$$H^{(1)} = \sigma\left(A_{\{v_{k,S'}, v_{k,S''}\}} H^{(0)} W^{(0)}\right),$$

where $A_\mathcal{U}$ represents the adjacency matrix for the subgraph containing nodes in the set $\mathcal{U}$ and their corresponding edges, and $H^{(0)}$ is the feature vector of the corresponding nodes.

(2) Propagate and aggregate up to seed nodes.

$$H^{(2)} = \sigma\left(A_{\{v_{k,S}, v_{k,S'}\}} H^{(1)} W^{(1)}\right).$$

Privacy is then incorporated at the various steps as described below. Essentially, whenever an adjacency matrix is used for computation, the resulting output is made private with respect to the computation by introducing noise.

To simplify the explanation, Applicants break down the above equations and add noise in the forward pass to the aggregation, and in the backward pass to the gradients. We present the algorithm in Algorithm 1, below:

---
Algorithm 1 Private GraphSAGE
---
1: Input:σ, δ, T, $C_1$, $C_2$.
2: Initialization: Normalize the input features:
   $x_i \leftarrow x_i/\|x_i\|_2$
3: for t ∈ [T] do
4:    Forward pass:
5:    Sample $V_s$ and construct $V_{s'}$ and $V_{s''}$.
6:    Sample the noise matrices $Z_t^{(0)}$, $Z_t^{(1)}$ and $Y_t^{(1)}$ from $\mathcal{N}(0, \sigma^2 C^2 I)$
   $\tilde{H}_t^{(0)} \leftarrow A_{\{V_{s'}, V_{s''}\}} X_t + Z_t^{(0)}$
   $H_t^{(1)} \leftarrow \tilde{H}_t^{(0)} W_t^{(0)}$
7:    Normalize the embeddings for each node in the batch
   : $h_i^{(1)} \leftarrow h_i^{(1)}/\|h_i^{(1)}\|_2$
   $\tilde{H}_t^{(1)} \leftarrow A_{\{V_s, V_{s'}\}} H_t^{(1)} + Z_t^{(1)}$
   $H_t^{(2)} \leftarrow \tilde{H}_t^{(1)} W_t^{(1)}$
8:    Backward pass:
9:    Compute the private gradients of the loss w.r.t the embeddings and the weights.
10:    $\nabla \tilde{H}_t^{(1)} \leftarrow A_{V_2, V_1} \nabla H_t^{(2)} + Y_t^{(1)}$
   $\nabla H_t^{(1)} \leftarrow \nabla \tilde{H}_t^{(1)} W_t^{(1)}$
   $\nabla W_t^{(1)} \leftarrow (\tilde{H}_t^{(1)})^T \nabla H_t^{(2)}$
   $\nabla W_t^{(0)} \leftarrow (\tilde{H}_t^{(0)})^T \nabla H_t^{(1)}$
11: end for
---

It is important to note that for Algorithm 1, the sampled unnormalized adjacency matrix is used A for the forward and backward passes. In this variation, A instead of $\hat{A}$ is used in the private version of the GCN model 120 and the reason is that enforcing privacy when using $\hat{A}$ gets more complicated as the normalization constants are computed using the entire graph while using A renders a much simpler embedding computation where contributions from each node can be written in the form of a simple sum query which makes reasoning about and enforcing privacy much easier, further, using A instead of $\hat{A}$ does not result in any drop in performance in terms of classification accuracies.

Accordingly, variations to Algorithm 1 are possible and Algorithm 1 is provided as an illustrative embodiment. For example, a different number of hops can utilized. In an embodiment, one hop is utilized. In another embodiment, two hops are utilized. In yet another embodiment, three hops are utilized. In yet another embodiment, four hops are utilized. Algorithm 1 can be adapted mutadis mutanis.

Differential privacy is ensured by the amplification theorem (due to sampling) and the composition theorem (composition over epochs and layers).

Applicants focus on the following operations required for the computation of a single node embedding which simplifies the privacy analysis.

For a node u:

(1) Uniformly sample a fixed-size set of neighbours $\mathcal{N}_u$ from the neighbour set.

(2) Clip each $h_i \in \mathcal{N}_u$ to have maximum $L_2$ norm of C.

(3) Perform a sum query to output the aggregated private embedding: $\tilde{h}_u = \sum_{i \in \mathcal{N}_u} h_i + \mathcal{N}(0, \sigma^2 C^2 I)$ Applicants validated the approach by determining the privacy cost of performing these computational operations, taking advantage of the amplification theorem for this purpose. The total cost of Algorithm is realised by composing this cost for all the nodes, layers and epochs.

Perform a sum query to output the aggregated private embedding under (3) above is a direct application of the Gaussian mechanism, and therefore satisfies $(\epsilon, \delta)$-differential privacy.

Since the set of edges used to perform aggregation for a single node is a random sample of the full graph, the privacy amplification theorem implies that the operation is $(O(q\epsilon), q\delta)$-differentially private with respect to the full graph. Here q is the probability of an edge belonging to the sampled set of edges.

Applicants compute an upper bound on q for a sampled set of edges E of size s using the procedure below:

1. An edge $e_{ij}$ would belong to the sampled set of edges if any of the following conditions are true:

Node i is sampled as a seed node and node j is sampled as its one-hop neighbour or vice-versa. The probability of occurrence of this event is proportional to $\min(s/d_i, 1) + \min(s/d_j, 1)$.

A neighbour of node i is sampled as a seed node, node i is sampled as a one-hop neighbour and node j is sampled as a two-hop neighbour, or vice-versa. The probability of occurrence of this event is proportional to $\min(s/d_j, 1) \cdot \sum_{k \in \mathcal{N}_i} \min(s/d_k, 1) + \min(s/d_j, 1) \cdot \sum_{k \in \mathcal{N}_i} \min(s/d_k, 1)$.

Therefore the probability of an edge $e_{ij}$ belonging to a sampled set of edges is less than or equal to the sum of the probabilities of occurrence of these two events.

Applicants denote this sum by $p_{ij} \cdot p_{ij}$ that can be determined using the above quantities and summing them over all the edges to find the normalization constant.

2. Applicants compute an upper bound of the amplification ratio q as $\Sigma_{e_{ij} \in E} p_{ij}$.

To compose privacy for the full model 120, Applicants add the amplified privacy cost for the set of nodes whose embeddings are computed within a layer l.

Applicants use the same procedure to privately compute the gradient of the loss with respect to the embeddings ($\nabla H^{(l)}$). Note that $\nabla H^{(l)}$ is used to compute $\nabla W^{(l-1)}$ which is in turn used to update the weight parameters of the model. Reusing privately computed $\tilde{H}^{(l-1)}$ in the forward pass with private $\nabla H^{(l)}$ in Step 10 of Algorithm above increases privacy for $\nabla W^{(l-1)}$ via the post processing theorem.

Composing the privacy cost of the algorithm over the layers and epochs is an instance of k-fold adaptive composition.

Furthermore, for fixed noise parameter a and clipping threshold C, the mechanisms described herein are heterogeneous as the amplification ratio q can vary for different nodes.

Figure 3:
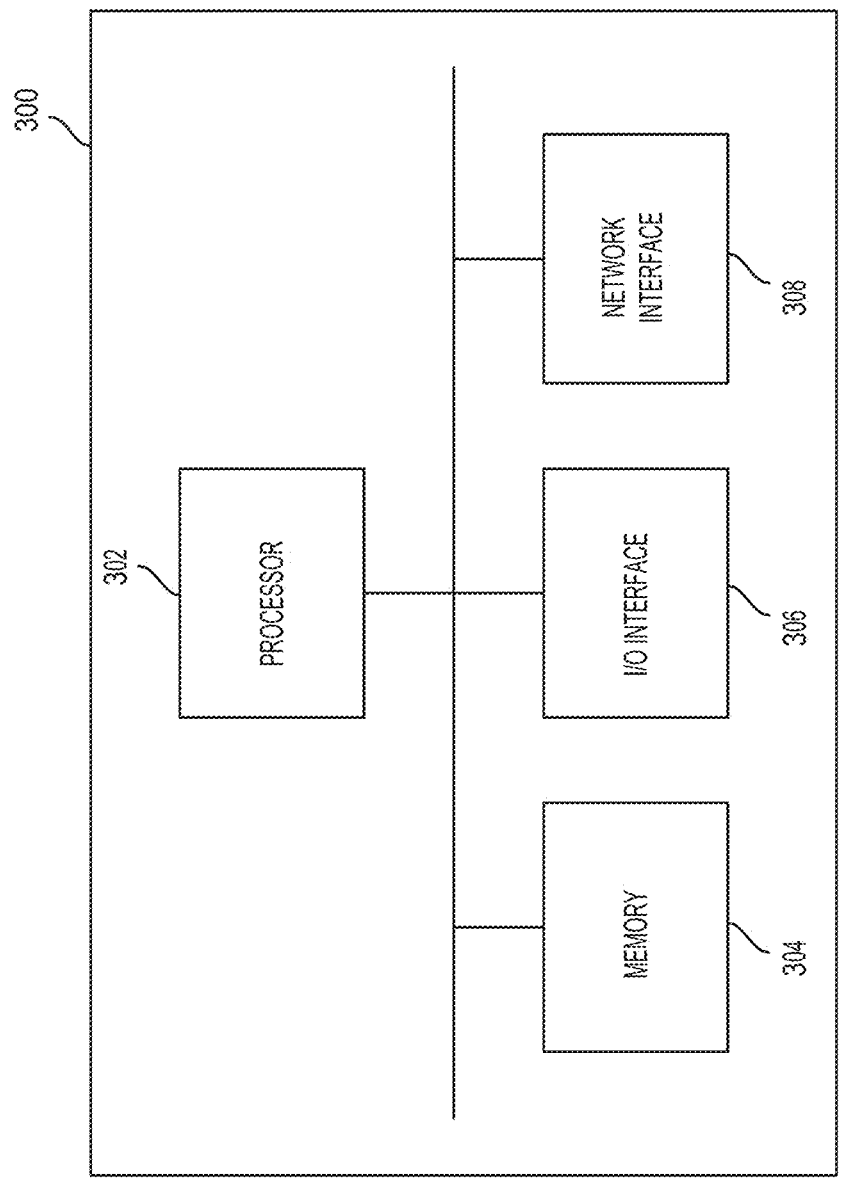
FIG. 3 is a schematic diagram of a computing device such as a server.

FIG. 3 is a schematic diagram of a computing device 300 such as a server. As depicted, the computing device includes at least one processor 302, memory 304, at least one I/O interface 306, and at least one network interface 308.

Processor 302 may be an Intel or AMD x86 or x64, PowerPC, ARM processor, or the like. Memory 304 may include a suitable combination of computer memory that is located either internally or externally such as, for example, random-access memory (RAM), read-only memory (ROM), compact disc read-only memory (CDROM).

Each I/O interface 306 enables computing device 300 to interconnect with one or more input devices, such as a keyboard, mouse, camera, touch screen and a microphone, or with one or more output devices such as a display screen and a speaker.

Each network interface 308 enables computing device 300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Figure 4B:
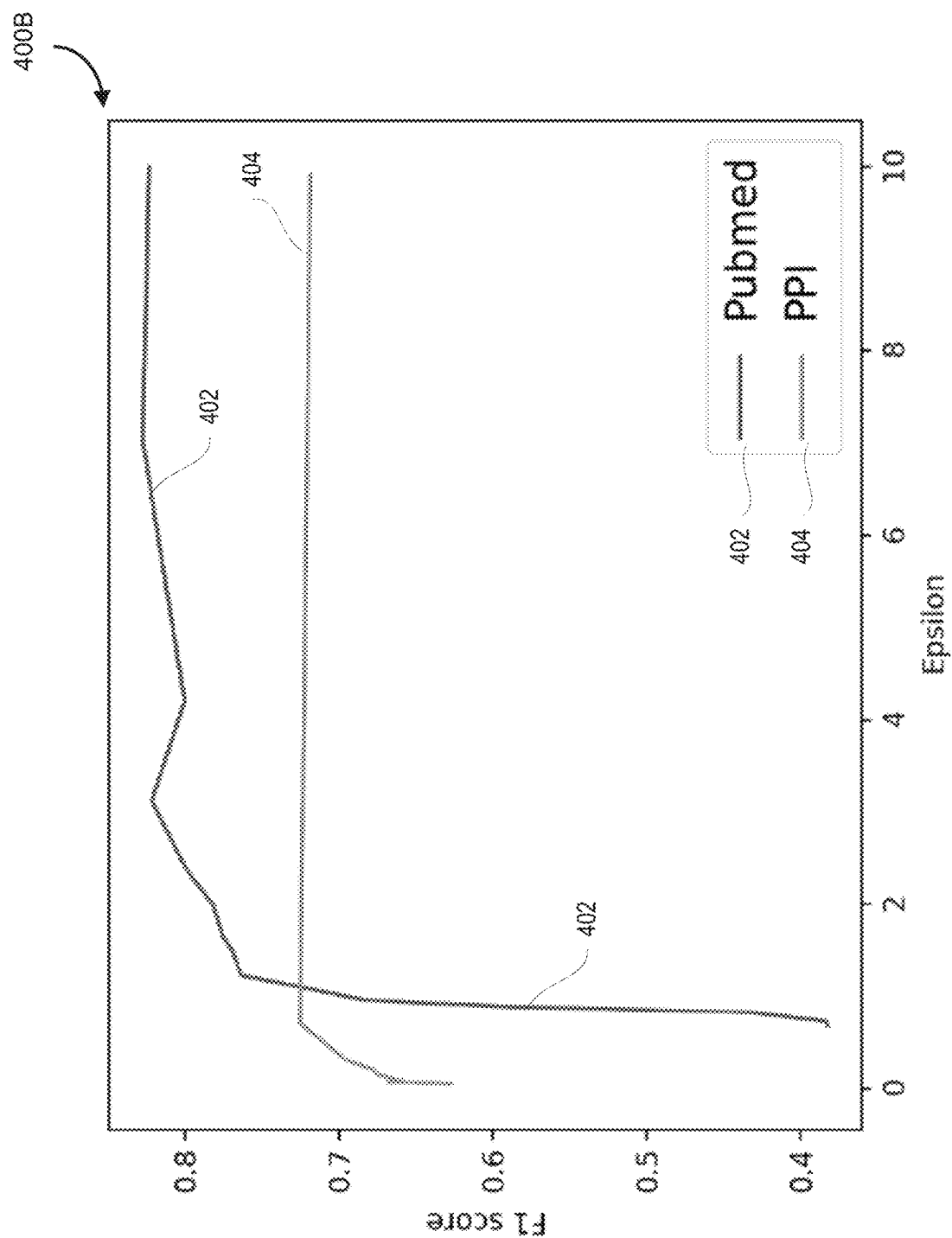
FIG. 4B is a plot showing F1 score vs epsilon for Pubmed and PPI datasets with a varied from 0.1 to 1.5 and 1 to 100 respectively, according to some embodiments.
Figure 4C:
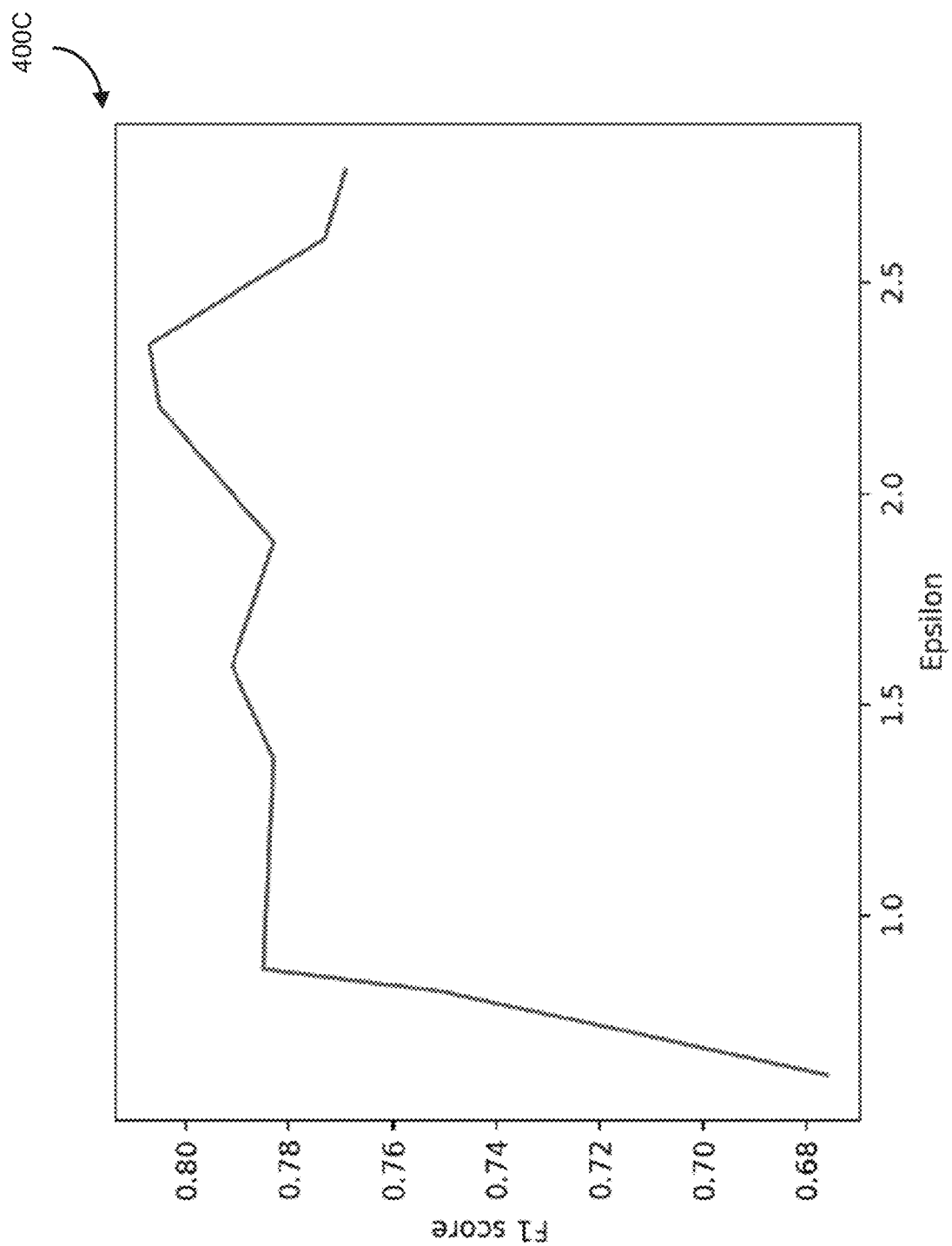
FIG. 4C is a plot showing F1 score vs epsilon for the Pubmed dataset when the number of epochs varies from 30 to 400, according to some embodiments.

Experiments are described in FIGS. 4A, 4B, and 4C. Applicants evaluate the performance of an embodiment of the privacy enhanced implementation of the inductive training mechanism to learn embeddings on the task of inductive node classification.

Applicant report results on i) citation networks where the tasks are to classify research topics using the Cora dataset and academic papers using the Pubmed dataset and ii) protein-protein interaction networks where the model is used to generalize across graphs on a multi-class classification task of predicting protein function.

While there is no obvious concern of edge privacy in the protein interactions dataset, Applicants use it as a proxy for a large graph with graph properties different from the citation dataset. The hypothesis is that the implementation of edge privacy is able to attain improved privacy outcomes while maintaining sufficient performance relative to the benchmark.

In the experimental setup, Applicants train the model privately as stated above and use the learned model and the embeddings to perform node classification for unseen nodes. Applicants do not consider the edges between the unseen nodes for prediction.

This is analogous to the case where predictions are made in an online fashion. The privacy guarantee ensures the edge information leaked by our model is carefully controlled.

All experiments are performed using the PyTorch framework. Models for Cora and Pubmed are trained for 300 epochs and for PPI for 60 epochs using the Adam optimizer with a learning rate of 0.01. In each epoch, only one batch of seed nodes are sampled uniformly at random from the entire set of nodes. Applicants use a batch size of 10 for all experiments.

To compute embeddings of a new node, Applicants need to aggregate embeddings of its 1-hop and 2-hop neighbours using the aggregation framework. However, the edges between the neighbours are sensitive and using them directly for inference would be a breach of privacy.

To overcome this, Applicants save the private embeddings computed using the last few iterations of our model and aggregate the embeddings of the node's 1-hop neighbours which belongs to this set of saved embeddings. Since the embeddings of the nodes and the weights of the model are already private, the resulting labels are private via the post-processing theorem. This prevents additional privacy cost during inference.

Citation Networks.

Applicants consider two citation network datasets: Cora and Pubmed.

The datasets contain bag-of-words features for each document and a list of citation links between documents. These links can be used to construct a binary, symmetric adjacency matrix.

Applicants randomly select 1000 nodes from each of these networks as test nodes. Applicants remove these nodes and their edges from the adjacency matrix and use the remaining graph to train our model. The model 120 is trained on the supervised learning task using the cross entropy loss.

Protein-Protein Interactions.

Applicants use the protein-protein interaction graphs for the task of generalizing across graphs The model is trained on twenty different graphs and predictions are performed on two new graphs. The task is of multi-label classification, as each node can have multiple labels.

From a privacy perspective, the inference is easier in this setting as the nodes in the test graphs do not share edges with nodes in graphs used during training. Therefore it suffices to learn the weights of the model privately without needing to save private node embeddings for inference.

Dataset properties are summarized in Table 1.

Hyperparameters are noted in Table 2.

TABLE 1

Dataset statistics

| Data set | Nodes | Edges | Features | Classes |
|---|---|---|---|---|
| Cora | 2,708 | 5,429 | 1,433 | 7 |
| Pubmed | 19,717 | 44,338 | 500 | 3 |
| PPI | 56,944 | 818,716 | 50 | 121 |
| Reddit | 232,965 | 11,606,919 | 602 | 41 |

TABLE 2

Hyperparameters

| Dataset | Epochs | Learning Rate | δ | Batch size | Num samples |
|---|---|---|---|---|---|
| Cora | 300 | 0.01 | $10^{-3}$ | 10 | 5 |
| Pubmed | 300 | 0.01 | $10^{-4}$ | 10 | 5 |
| PPI | 60 | 0.01 | $10^{-5}$ | 10 | 30 |
| Reddit | 600 | 0.001 | $10^{-7}$ | 100 | 25 |

Applicants summarize results in FIGS. 4A-4C, and present the non-private baselines for all datasets in Table 3.

FIG. 4A is a plot 400A showing F1 score vs epsilon for the Cora dataset with σ varied from 0.1 to 1, according to some embodiments.

FIG. 4B is a plot 400B showing F1 score vs epsilon for Pubmed 402 and PPI 404 datasets with σ varied from 0.1 to 1.5 and 1 to 100 respectively, according to some embodiments.

FIG. 4C is a plot 400C showing F1 score vs epsilon for the Pubmed dataset when the number of epochs varies from 30 to 400, according to some embodiments.

Applicants note that there are several parameters in this framework that can be tuned to get the desired privacy utility tradeoff. Applicants discuss tuning these parameters in the context of the mentioned datasets below.

Noise Level.

The amount of noise added to H and ∇H has a significant impact on accuracy. Increasing the noise level decreases the privacy cost of each step but can result into poor convergence of gradient descent impacting accuracy.

Applicants plot this tradeoff keeping other parameters fixed for the respective datasets in FIG. 4A and FIG. 4B.

Number of Epochs.

The privacy cost increases with the number of epochs the model is trained for. A greater number of epochs can lead to better convergence and improved accuracy. Applicants plot this relationship in FIG. 4C.

Clipping Threshold.

Varying the clipping threshold has two opposing effects on the training procedure. A large clipping threshold results in fewer entries of H and ∇H being clipped, limiting the bias of the clipped parameters. However, it also results in adding more noise to the aggregated embeddings which can affect convergence.

TABLE 3

Non-private baseline results

| Data set | F1 score |
|---|---|
| Cora | 0.77 |
| Pubmed | 0.83 |
| PPI | 0.74 |
| Reddit | 0.84 |

Applicants have presented a privacy-preserving method for learning node embeddings in an inductive GCN framework, for predicting labels of unseen nodes. Numerical results included here show promising results for the implementation of the approach.

As shown in FIGS. 4A-4C, while there is some level of cost relating to implementing privacy, nonetheless the mechanism of the test embodiment attains sufficient technical performance such that it is practically implementable in practical scenarios.

Figure 5:
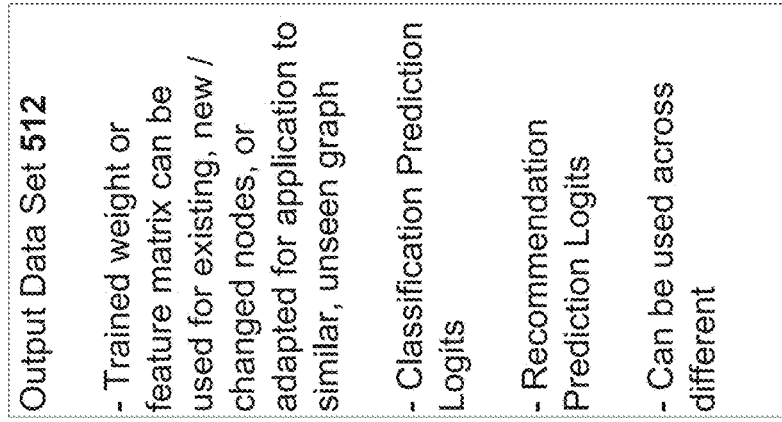
FIG. 5 is an example block schematic of a practical implementation of the platform, according to some embodiments.
Figure 5:
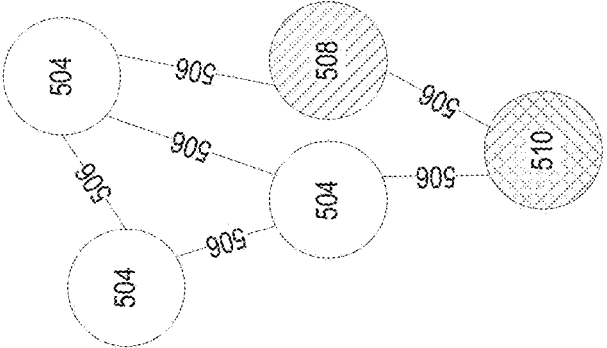

FIG. 5 is an example block schematic 500 of a practical implementation of the platform, according to some embodiments.

As shown herein, the platform 100 receives an input graph data structure 502, the input graph data structure representing a set of node data objects 504 having embedding data values and weighted edge data objects 506, the weighted edge data objects 506 representing one or more characteristics of relationships between two or more node data objects of the set of node data objects.

In this example, it is important to be able to be able to preserve the privacy of the edge weights of weighted edge data objects 506. There can be different variations utilized. For example, 508 can be a malicious node that is collecting observations based on the outputs 512, and 510 can be a new or updated node that the platform 100 is adapted to generate new classifications or prediction outputs 512 for.

Figure 6:
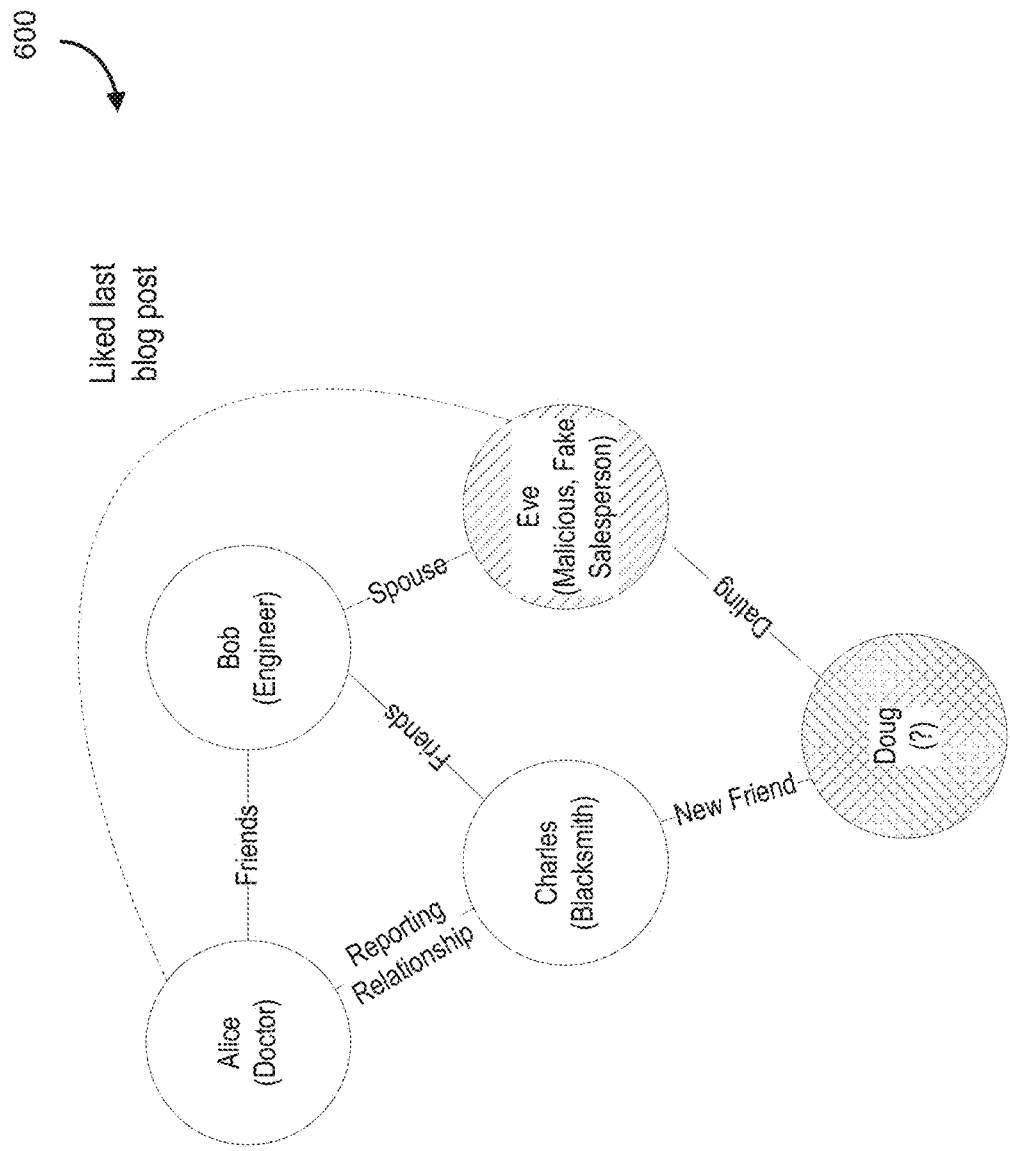
FIG. 6 is an example input graph data structure relating to a social network, according to some embodiments.

FIG. 6 is an example input graph data structure 600 relating to a social network, according to some embodiments. In this example, the graph data structure has five people, Alice, Bob, Charles, Doug, and Eve. Each of them have certain related classification (node information), in this simplified example, their job title. Eve is a malicious user who is computer generated to simply record observations generated by the model 120 so that she is able to identify the reporting relationship between Alice and Charles. She inputs in various combinations of false information and relationships to be able to obtain variations of observations generated by the model 120.

Doug is a user whose job title is not known. In this example, the model 120, after training can be used to estimate his job title, for example.

Because model 120 is built using an inductive learning approach using both sampling and noise injection, it should be more technically difficult for Eve to ascertain the relationships from her observations as perturbations from the noise make specific relationships unclear.

The level of obfuscation rises with the noise level, but that also impacts performance (e.g., the identification of Doug's title is no longer as accurate).

A variation of FIG. 6 would be genetic information, where users use a service where they provide genetic samples and a genealogy chart is generated. It is important to have security on edge weight information as the underlying relationships could otherwise indicate aspects such as hereditary disease, among others. On the other hand, predictions are useful for someone to computationally estimate whether they are susceptible to a hereditary disease. In this example, accuracy and privacy are balanced against one another in the technical implementation.

Figure 7:
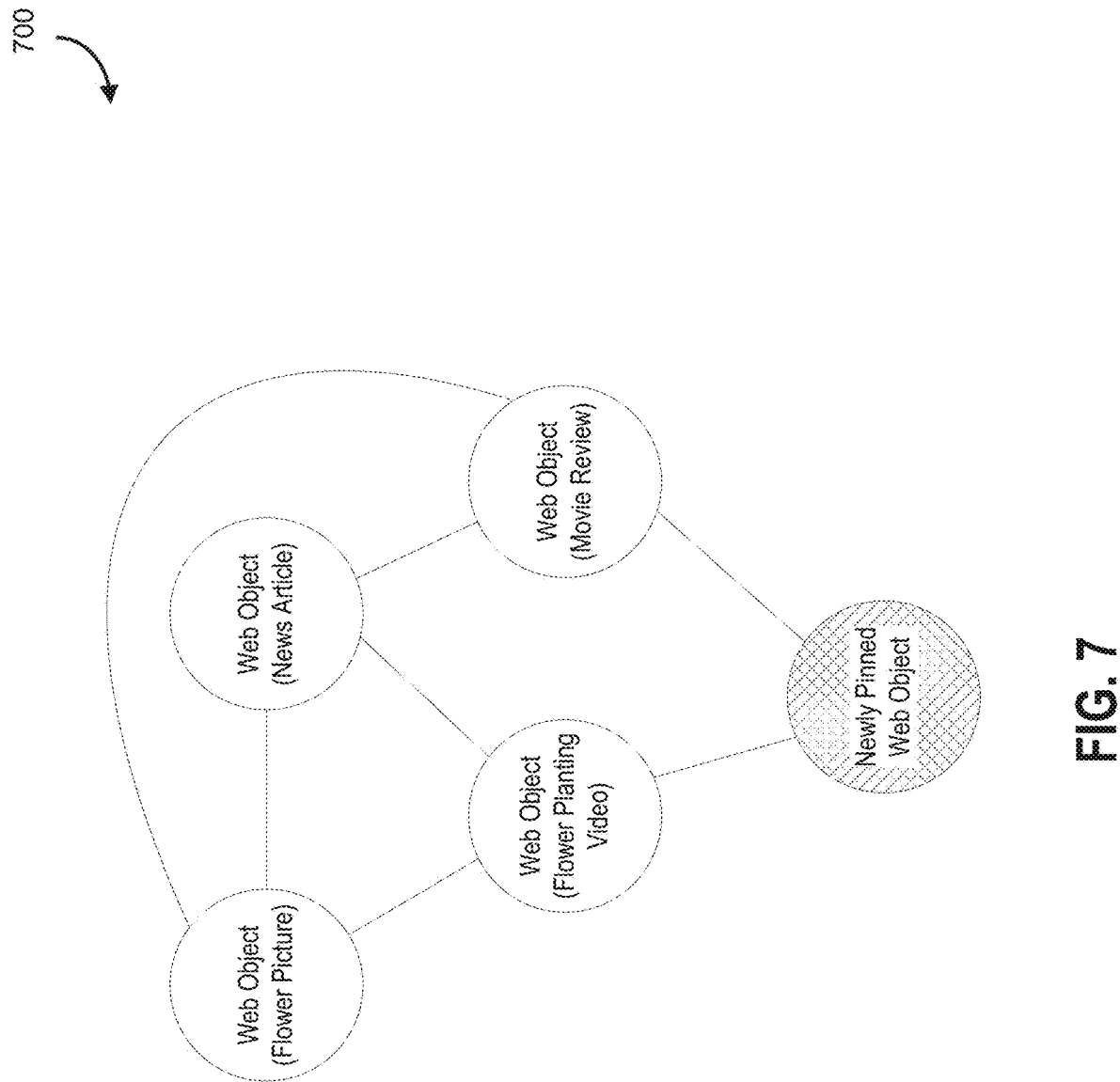
FIG. 7 is an example input graph data structure relating to a web data object network, according to some embodiments.

FIG. 7 is an example input graph data structure 700 relating to a web data object network, according to some embodiments. In this example, a user "pins" various web objects such that the user draws his/her own graph network structure of related objects which are then shared. In this example, instead of people, the nodes can represent various web objects, such as news articles, pictures, videos, etc. If the model 120 in this example is trained on other people's graphs, it is not desirable for this user to be able to reverse engineer the graphs for other people, which may have sensitive information.

Figure 8:
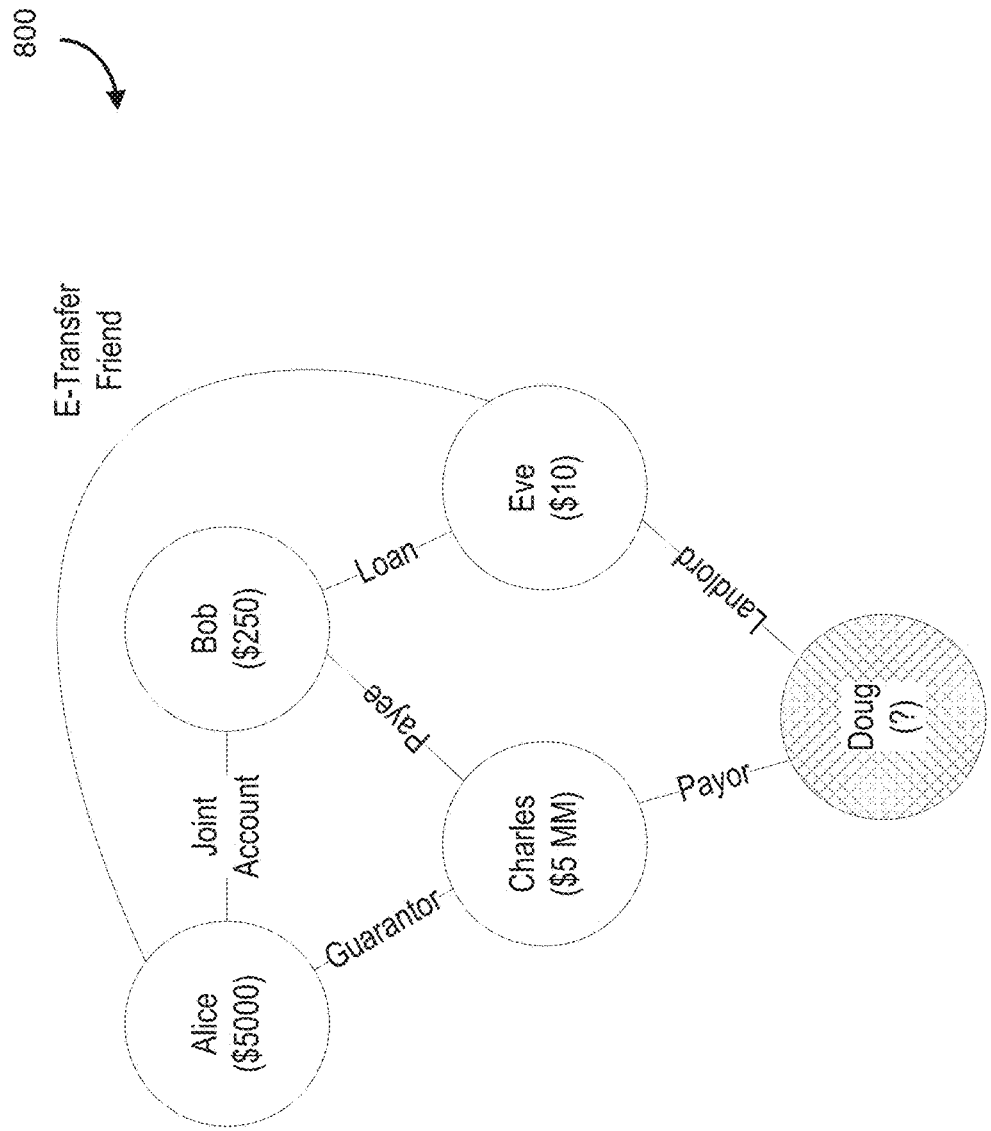
FIG. 8 is an example input graph data structure relating to a financial institution's personal information network, according to some embodiments.

FIG. 8 is an example input graph data structure 800 relating to a financial institution's personal information network, according to some embodiments. This example is similar to that of FIG. 6, except instead of human relationships, financial relationships are utilized and the node information is account balance information. Variations are possible, for example where the financial information is associated with merchants or individual accounts instead as nodes, or a heterogeneous mix of nodes where users, merchants, and business entities can be nodes. The information can be automatically seeded, for example, through loan documents, transaction records, interaction records, among others.

In all of these examples, it is imperative that when inductive learning is conducted, there is reduced (or no) leakage of personal information stored on the edge weights.

The platform 100 can be used to generate various outputs, such as new classifications for new nodes, prediction outputs, such as recommended friend/contacts/object recommendations (e.g., "you might be interested in these new action films").

However, it is important that noise is injected at various phases of the learning so that a malicious user, for example, is not able to effectively "reverse engineer" the graph (in particular, the edge weights or the existence of edges) using a large number of observed inductive learning outputs. For example, it is undesirable that a malicious user represented by node 508 is able to observe a large amount (e.g., hundreds of thousands) of friend recommendations, and thus utilize that to re-build a social network graph (or portions thereof) where specific friend relationships as between nodes are now able to be identified.

As described above, the platform 100 iteratively updates the feature matrix data object across one or more training epochs, wherein for each training epoch, there is a forward pass for aggregating embeddings from leaf nodes established from one or more neighbor hop degrees of neighboring nodes.

The forward pass can include, for example, sampling a subset of nodes represented in the set of node data objects to establish a seed node subgraph; generating one or more noise matrices; and constructing one or more extended node sets, each corresponding to a neighbor hop degree of the one or more degrees of neighbor hop degrees.

During the forward pass, at each neighbor degree of the one or more neighbor hop degrees: an aggregated embedding is determined by: utilizing (1) an adjacency matrix corresponding to the neighbor hop degree multiplied with a matrix representing the embedding data values of the extended node set corresponding to the neighbor hop degree and (2) adding a noise matrix of the one or more noise matrices, and then generating lower dimensionality node embedding data values by conducting dimensionality reduction using the feature matrix data object.

A backward pass is then utilized to effectively update the GCN in model 120 by at each neighbor degree of the one or more neighbor hop degrees (e.g., two hops), computing one or more private gradients of the loss function by utilizing (1) the adjacency matrix corresponding to the neighbor hop degree multiplied with gradients corresponding to the embedding data values of the extended node set corresponding to the neighbor hop degree and adding (2) a noise matrix of the one or more noise matrices; and updating the feature matrix data object using the computed one or more private gradients.

The outputs of the platform 100 can include a trained GCN provided in model 120 as iteratively trained using the privacy-enhanced approach described herein. The trained GCN can then be used to generate output data sets 512.

In an example output data set 512, the model 120 can be used in relation to existing, new or updated nodes in the graph. In this embodiment, for example, a social network may have nodes either missing information (e.g., individuals with no job titles) and the model 120 can be used to suggest job titles (e.g., "are you an architect? If so, please yes and add it to your profile!). The model 120 can also be utilized for classifying a new node based on, for example, information that was provided when a user makes a new account ("you might like the pop music of the 1990s!"), or recommend friends ("we would like to suggest Adam Smith as your friend!).

Adding noise to the forward pass and the backward pass incurs a privacy-related technical performance cost, but as noted herein, the cost of the proposed approaches is sufficiently small such that a practical implementation of the inductive learning while maintaining a level of improved privacy is technically feasible. In variant embodiments, specific "tuning" aspects can be further utilized to vary the privacy/utility trade-off.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for introducing edge weight privacy when conducting inductive learning on a graph convolutional network maintaining a feature matrix data object, the system comprising:

a processor coupled with computer memory and a data storage, the processor configured to:

receive an input graph data structure, the input graph data structure representing a set of node data objects having embedding data values and weighted edge data objects, the weighted edge data objects representing one or more characteristics of relationships between two or more node data objects of the set of node data objects;

iteratively update the feature matrix data object across one or more training epochs, wherein for each training epoch, there is:

a forward pass for aggregating embeddings from leaf nodes established from one or more neighbor hop degrees of neighboring nodes, the forward pass including:

sampling a subset of nodes represented in the set of node data objects to establish a seed node subgraph;

generating one or more noise matrices;

constructing one or more extended node sets, each corresponding to a neighbor hop degree of the one or more degrees of neighbor hop degrees; and at each neighbor degree of the one or more neighbor hop degrees:

determining an aggregated embedding by: utilizing (1) an adjacency matrix corresponding to the neighbor hop degree multiplied with a matrix representing the embedding data values of the extended node set corresponding to the neighbor hop degree and (2) adding a noise matrix of the one or more noise matrices; and generating lower dimensionality node embedding data values by conducting dimensionality reduction using the feature matrix data object; and a backward pass including:

at each neighbor degree of the one or more neighbor hop degrees:

computing one or more private gradients of the loss function by utilizing (1) the adjacency matrix corresponding to the neighbor hop degree multiplied with gradients corresponding to the embedding data values of the extended node set corresponding to the neighbor hop degree and adding (2) a noise matrix of the one or more noise matrices; and updating the feature matrix data object using the computed one or more private gradients.

2. The system of claim 1, wherein the input graph data structure is evolving with new or updated nodes.

3. The system of claim 2, wherein the processor is configured, for at least one new or updated node, utilize the trained graph convolutional network to generate a prediction data object relating to the at least one new or updated node.

4. The system of claim 3, wherein the prediction data object is adapted to generate one or more connection recommendations identifying a target node that the at least one new or updated node is computationally estimated to be related with.

5. The system of claim 4, wherein the input graph data structure is a social networking graph, and wherein the one or more connection recommendations include at least one of friend, business contact, and colleague recommendations.

6. The system of claim 1, wherein the prediction data object is adapted to generate a predicted classification label associated with the at least one new or updated node.

7. The system of claim 6, wherein the input graph data structure is a social networking graph where each node represents an individual, and the predicted classification label is at least one of a personal characteristic of the individual.

8. The system of claim 1, wherein the sampling follows a probability distribution of:

$$q(u) = \frac{d_u^p}{\sum_{v \in V} d_v^p}, u \in V;$$

where $d_u^p$ refers to the number of edges of node 'u' in the graph raised to a power p.

9. The system of claim 8, wherein p is a modifiable parameter that varies an intensity to which high degree nodes are sampled for the subset of nodes.

10. The system of claim 1, wherein the one or more degrees of neighbor hop degrees includes two degrees of neighbor hop degrees.

11. A method for introducing edge weight privacy when conducting inductive learning on a graph convolutional network maintaining a feature matrix data object, the method comprising:
receiving an input graph data structure, the input graph data structure representing a set of node data objects having embedding data values and weighted edge data objects, the weighted edge data objects representing one or more characteristics of relationships between two or more node data objects of the set of node data objects;
iteratively update the feature matrix data object across one or more training epochs, wherein for each training epoch, there is:
a forward pass for aggregating embeddings from leaf nodes established from one or more neighbor hop degrees of neighboring nodes based at least on the weighted edge data objects or one or more adjacency matrices based at least on the weighted edge data objects, and
a backward pass for computing one or more private gradients that are used for updating the feature matrix data object using the computed one or more private gradients based at least on the weighted edge data objects or the one or more adjacency matrices;
wherein every computing operation in the forward pass and the backward pass that utilize the weighted edge data objects or one or more adjacency matrices include a step of adding noise after utilizing the weighted edge data objects or the one or more adjacency matrices.

12. The method of claim 11, wherein the input graph data structure is evolving with new or updated nodes.

13. The method of claim 12, wherein the processor is configured to identify the new or updated nodes in the input graph data structure, and for at least one new or updated node, utilize the trained graph convolutional network to generate a prediction data object relating to the at least one new or updated node.

14. The method of claim 13, wherein the prediction data object is adapted to generate one or more connection recommendations identifying a target node that the at least one new or updated node is computationally estimated to be related with.

15. The method of claim 14, wherein the input graph data structure is a social networking graph, and wherein the one or more connection recommendations include at least one of friend, business contact, and colleague recommendations.

16. The method of claim 11, wherein the prediction data object is adapted to generate a predicted classification label associated with the at least one new or updated node.

17. The method of claim 16, wherein the input graph data structure is a social networking graph where each node represents an individual, and the predicted classification label is at least one of a personal characteristic of the individual.

18. The method of claim 11, wherein an amount of noise added during the forward pass and an amount of noise added during the backward pass are different.

19. The method of claim 11, wherein embedding parameters are clipped.

20. A non-transitory computer readable medium storing machine interpretable instructions, the machine interpretable instructions, which when executed by a processor, cause the processor to perform a method for introducing edge weight privacy when conducting inductive learning on a graph convolutional network maintaining a feature matrix data object, the method comprising:
receiving an input graph data structure, the input graph data structure representing a set of node data objects having embedding data values and weighted edge data objects, the weighted edge data objects representing one or more characteristics of relationships between two or more node data objects of the set of node data objects;
iteratively update the feature matrix data object across one or more training epochs, wherein for each training epoch, there is:
a forward pass for aggregating embeddings from leaf nodes established from one or more neighbor hop degrees of neighboring nodes based at least on the weighted edge data objects or one or more adjacency matrices based at least on the weighted edge data objects, and
a backward pass for computing one or more private gradients that are used for updating the feature matrix data object using the computed one or more private gradients based at least on the weighted edge data objects or the one or more adjacency matrices;
wherein every computing operation in the forward pass and the backward pass that utilize the weighted edge data objects or one or more adjacency matrices include a step of adding noise after utilizing the weighted edge data objects or the one or more adjacency matrices.

* * * * *